Figure 1:
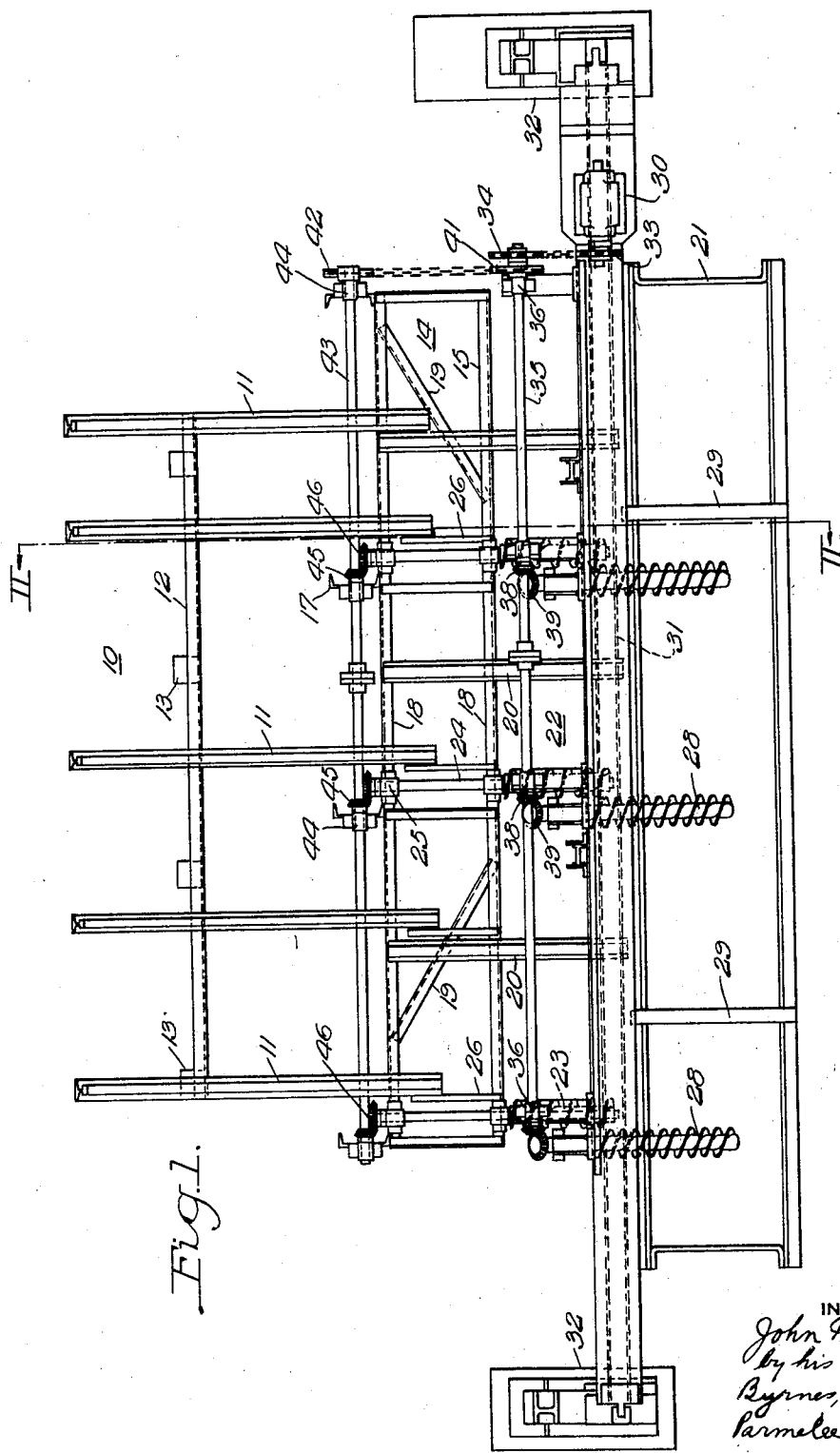

July 26, 1932.　　　　J. W. FREE　　　　1,869,324
MECHANICAL FEED FOR PIPE GALVANIZING MACHINES
Filed Sept. 19, 1929　　2 Sheets-Sheet 1

INVENTOR
John W. Free
by his attorneys
Byrnes, Stebbins,
Parmelee & Blenko

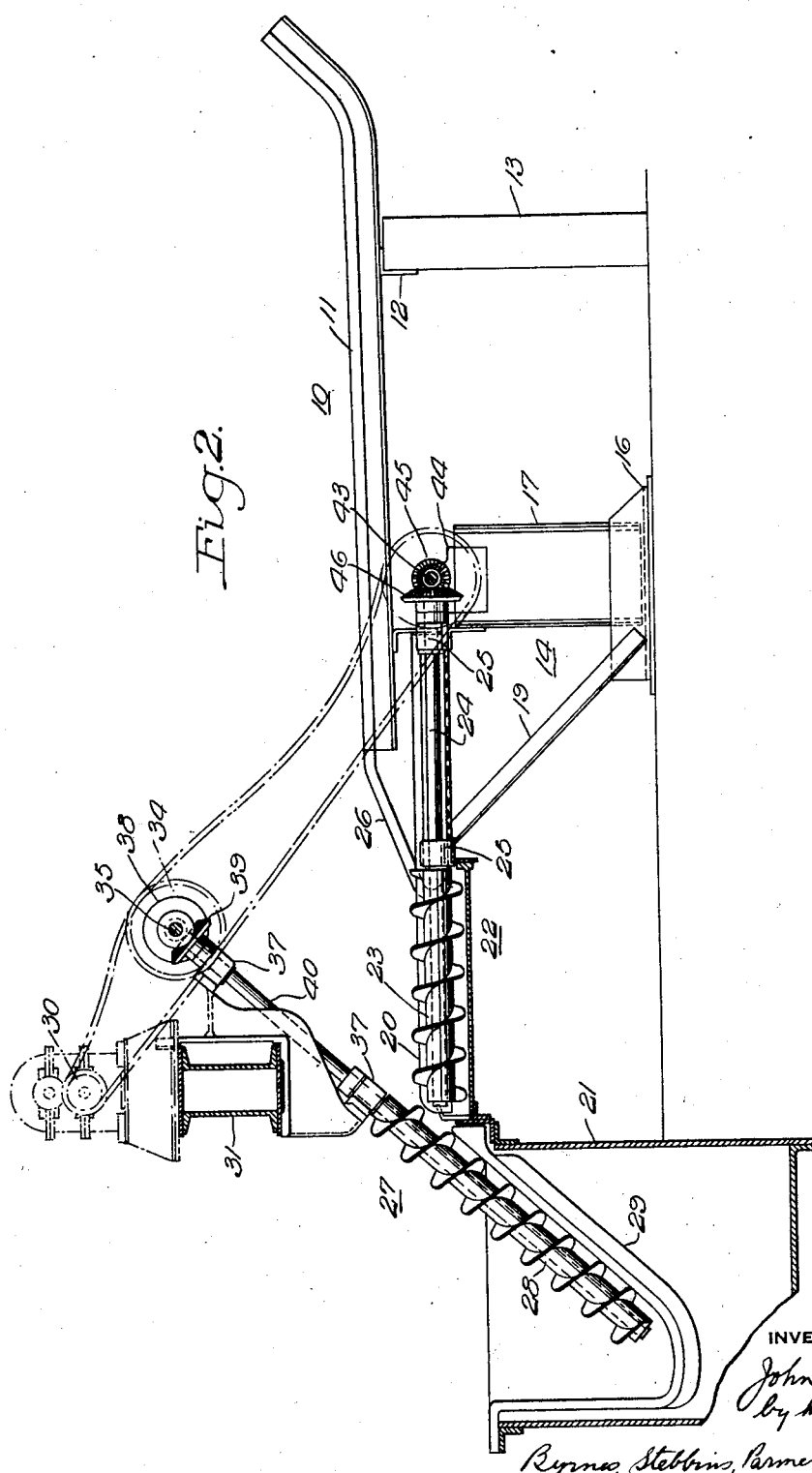

Patented July 26, 1932

1,869,324

UNITED STATES PATENT OFFICE

JOHN W. FREE, OF ALIQUIPPA, PENNSYLVANIA, ASSIGNOR TO JONES AND LAUGHLIN STEEL CORPORATION, OF PITTSBURGH, PENNSYLVANIA, A CORPORATION OF PENNSYLVANIA

MECHANICAL FEED FOR PIPE GALVANIZING MACHINES

Application filed September 19, 1929. Serial No. 393,615.

My invention relates to automatic devices for feeding cylindrical members through a galvanizing or other coating bath.

It has been observed in galvanizing devices known heretofore that when a length of pipe is introduced into the galvanizing bath, the considerable density of the latter tends to float the pipe length. This tendency prevents the pipe from obtaining a uniform coat of galvanizing.

In order to overcome this disadvantage and to provide a galvanizing device having other novel features, I use a screw conveyor to feed pipe lengths laterally from a receiving table to a second conveyor of similar type. The second conveyor is positioned at an angle to the horizontal and extends into a galvanizing bath. I provide guides adjacent the inclined conveyor to maintain the pipe lengths in engagement therewith. A common driving means is employed for actuating both of the conveyors.

For a complete description of my invention, reference is made to the accompanying drawings of which Figure 1 is a plan view of a present preferred embodiment of the galvanizing device of my invention.

Figure 2 is a sectional view with parts in elevation along the line II—II of Figure 1.

Referring in detail to the drawings, my invention comprises a receiving table 10. This table consists of a plurality of skids 11 which are supported by a frame including a transverse beam member 12 and the standards 13. The skids 11 extend from the cooling table of a pipe mill (not shown) to a horizontal pipe feeding device 14.

The device 14 consists of a frame 15 built up of bottom plates 16, columns 17, longitudinal frame members 18 and bracing members 19. Skids 20 extend from the frame 14 to a galvanizing tank 21 which is adapted to contain molten galvanizing material.

A horizontal screw conveyor 22 consists of a plurality of actuating screws 23. The screws 23 are mounted on shafts 24 which are journalled in suitable bearings 25 on the frame 14. The spiral portions of the screws 23 extend slightly above the top of the skids 20 so that pipe lengths may be moved there along by the screws. Guides 26 are provided to transfer pipe lengths from the skids 11 to the skids 20 where they are engaged by the screws 23.

A second screw conveyor 27 is disposed at an angle to the conveyor 22 and the lower ends of the screw members 28 thereof extend downwardly below the surface of the galvanizing bath in the tank 21. A plurality of guides 29 are also located in the galvanizing tank for cooperation with the screw conveyor 27. The pipe lengths are passed along the skids 20 by the conveyor 22 to the conveyor 27 which forces them slowly down into the galvanizing bath while engaged by the guides 29. When the pipe lengths have passed beyond the conveyor 27 they may be lifted from the bath by means of any convenient hoisting mechanism.

In order to effect simultaneous, uniform and synchronous movement of the screw conveyors 22 and 23, I provide a common driving means therefor. The driving means which I prefer to employ is an electric motor 30, mounted on a transverse beam 31. The beam 31 is supported on columns 32 and extends the length of the galvanizing device above the screw conveyors thereof. The motor 30 has a sprocket wheel 33 mounted on its shaft which is adapted to drive a sprocket wheel 34 through the medium of a chain. The sprocket wheel 34 is mounted on a shaft 35 which is journalled in suitable bearings 36 supported from the beam 31. This structure also provides journal bearings 37 for the inclined screw conveyor 27. The shaft 35 is provided with a plurality of bevel gears 38 which are adapted to engage corresponding gears 39 on a shaft 40, constituting part of the screw conveyor 27.

A second sprocket wheel 41 is also mounted on the shaft 35 and, by means of a chain drives a sprocket wheel 42 on a shaft 43. The shaft 43 rotates in suitable bearings 44 and is provided with bevel gears 45 which are adapted to cooperate with similar gears 46 on the shafts 24 of the screw conveyor 22.

It will be apparent from the foregoing that the motor 30 operates through the medium of the sprocket wheels, chains, shafts and bevel gears to drive the screw members 23 and 28 of the conveyors 22 and 27 at the same speed. The motor 30 is preferably of the variable speed type so that the speed of the screw conveyors may be readily changed to provide different thicknesses of galvanized coating for various sizes and kinds of pipe. It is also obvious that the screw conveyors effect a positive driving action so that any tendency of the pipe lengths to float in the coating bath is overcome. The pipe lengths are thus given a uniform coating of galvanizing material in a very short time.

Although I have described and illustrated but a single preferred embodiment of my invention it is not my intention to be limited thereto since the invention may be embodied in other forms than that shown without departing from the spirit thereof as defined by the scope of the appended claims.

I claim:

1. In a pipe-galvanizing apparatus, the combination with a receiving table for supporting a plurality of pipe lengths, and a horizontal screw conveyor, of a galvanizing bath, guides immersed in said bath, and an inclined screw conveyor cooperating therewith for receiving pipe lengths from said horizontal conveyor and passing them laterally through said bath while engaged by said guides, and common driving means for said conveyors.

2. The combination with a galvanizing tank, of a set of screw conveyors extending thereinto at an angle, guides in the tank, and another set of screw conveyors for feeding pipe lengths up to said first-mentioned conveyors and onto said guides.

3. A feeder for a galvanizing apparatus comprising a set of substantially horizontal screw conveyors, and a set of inclined screw conveyors projecting into a galvanizing tank and adapted to receive material from said first set of conveyors.

4. In a galvanizing machine, the combination with a galvanizing tank, a screw conveyor for advancing articles to be coated laterally toward the tank, a second screw conveyor at an angle to the first for lowering the articles into the bath, and guides in the tank for directing the movement of the articles through the bath.

In testimony whereof I have hereunto set my hand.

JOHN W. FREE.